US011998053B2

(12) United States Patent
Yoon et al.

(10) Patent No.: US 11,998,053 B2
(45) Date of Patent: Jun. 4, 2024

(54) AEROSOL-GENERATING DEVICE AND AEROSOL-GENERATING SYSTEM INCLUDING THE SAME

(71) Applicant: KT&G CORPORATION, Daejeon (KR)

(72) Inventors: Sung Wook Yoon, Gyeonggi-do (KR); Yong Hwan Kim, Gyeonggi-do (KR); Seung Won Lee, Gyeonggi-do (KR); Dae Nam Han, Seoul (KR)

(73) Assignee: KT&G CORPORATION, Daejeon (KR)

( * ) Notice: Subject to any disclaimer, the term of this patent is extended or adjusted under 35 U.S.C. 154(b) by 658 days.

(21) Appl. No.: 17/267,543

(22) PCT Filed: Dec. 8, 2020

(86) PCT No.: PCT/KR2020/017844
§ 371 (c)(1),
(2) Date: Feb. 10, 2021

(87) PCT Pub. No.: WO2021/125665
PCT Pub. Date: Jun. 24, 2021

(65) Prior Publication Data

US 2022/0408821 A1 Dec. 29, 2022

(30) Foreign Application Priority Data

Dec. 17, 2019 (KR) ........................ 10-2019-0168999

(51) Int. Cl.
*A24F 40/465* (2020.01)
*A24F 40/20* (2020.01)
*H05B 6/10* (2006.01)

(52) U.S. Cl.
CPC ............ *A24F 40/465* (2020.01); *A24F 40/20* (2020.01); *H05B 6/105* (2013.01)

(58) Field of Classification Search
CPC .......... A24F 40/00; A24F 40/20; A24F 40/40; A24F 40/46; A24F 40/465; H05B 6/10; H05B 6/105–109
(Continued)

(56) References Cited

U.S. PATENT DOCUMENTS

| | | | |
|---|---|---|---|
| 9,357,803 | B2 | 6/2016 | Egoyants et al. |
| 11,602,173 | B2 | 3/2023 | Thorsen |

(Continued)

FOREIGN PATENT DOCUMENTS

| | | | |
|---|---|---|---|
| CN | 107080292 | A | 8/2017 |
| CN | 107920602 | A | 4/2018 |

(Continued)

OTHER PUBLICATIONS

Japanese Office Action dated Jan. 17, 2023 in Japanese Application No. 2021-518765.

(Continued)

*Primary Examiner* — Khiem M Nguyen
(74) *Attorney, Agent, or Firm* — Sughrue Mion, PLLC

(57) ABSTRACT

An aerosol-generating device includes a housing having an opening configured to receive an aerosol-generating article; an accommodating space configured to accommodate the aerosol-generating article inserted through the opening; a heat-dissipating structure comprising an inner wall forming the accommodating space, and an outer wall surrounding the inner wall such that an inner space is formed between the inner wall and the outer wall; and a coil arranged between the outer wall and the housing, and configured to generate an induced magnetic field, wherein the inner wall is configured to generate heat by the induced magnetic field generated from the coil.

11 Claims, 8 Drawing Sheets

(58) Field of Classification Search
USPC .......................................................... 131/329
See application file for complete search history.

(56) References Cited

U.S. PATENT DOCUMENTS

| | | | |
|---|---|---|---|
| 2015/0245669 | A1 | 9/2015 | Cadieux et al. |
| 2017/0055580 | A1 | 3/2017 | Blandino et al. |
| 2017/0055583 | A1 | 3/2017 | Blandino et al. |
| 2017/0095006 | A1 | 4/2017 | Egoyants et al. |
| 2018/0070639 | A1 | 3/2018 | Chen et al. |
| 2018/0271171 | A1 | 9/2018 | Abramov et al. |
| 2019/0159517 | A1 | 5/2019 | Ballesteros Gomez et al. |
| 2020/0054069 | A1 | 2/2020 | Blandino et al. |
| 2020/0154768 | A1 | 5/2020 | Han et al. |
| 2020/0359693 | A1 | 11/2020 | Lee et al. |
| 2022/0394824 | A1 | 12/2022 | Blandino |

FOREIGN PATENT DOCUMENTS

| | | | |
|---|---|---|---|
| CN | 109496129 | A | 3/2019 |
| CN | 109788801 | A | 5/2019 |
| JP | 5879435 | B2 | 3/2016 |
| JP | 2018-529324 | A | 10/2018 |
| KR | 10-2014-0068808 | A | 6/2014 |
| KR | 10-2018-0034640 | A | 4/2018 |
| KR | 10-2018-0070455 | A | 6/2018 |
| KR | 10-2019-0049415 | A | 5/2019 |
| WO | 2019/030301 | A1 | 2/2019 |
| WO | 2019/030363 | A1 | 2/2019 |
| WO | 2019/053268 | A1 | 3/2019 |
| WO | 2019/073237 | A1 | 4/2019 |
| WO | 2019/129630 | A1 | 7/2019 |

OTHER PUBLICATIONS

Office Action dated Apr. 17, 2023 in Chinese Application No. 202080005575.6.

Notification of Reason for Refusal dated Aug. 17, 2021 from the Korean Intellectual Property Office in KR Application No. 10-2019-0168999.

Extended European Search Report dated Dec. 15, 2021 from the European Patent Office in EP Application No. 20862007.0.

International Search Report dated Jun. 4, 2021 in International Application No. PCT/KR2020/017844.

AEROSOL-GENERATING DEVICE AND AEROSOL-GENERATING SYSTEM INCLUDING THE SAME

CROSS REFERENCE TO RELATED APPLICATIONS

This application is a National Stage of International Application No. PCT/KR2020/017844 filed Dec. 8, 2020, claiming priority based on Korean Patent Application No. 10-2019-0168999 filed Dec. 17, 2019.

TECHNICAL FIELD

Embodiments relate to an aerosol-generating device including a heat-dissipating structure and an aerosol-generating system including the same, and more particularly, to an aerosol-generating device including a heat-dissipating structure capable of preventing damage that may occur as heat is delivered to the outside of the device while an aerosol-generating article is heated, and an aerosol-generating system including the same.

BACKGROUND ART

Recently, the demand for alternative methods to overcome the shortcomings of general cigarettes has increased. For example, there is growing demand for an aerosol-generating device that generates aerosols by heating an aerosol generating material, rather than by combusting cigarettes. Accordingly, studies on a heating-type cigarette and a heating-type aerosol-generating device have been actively conducted.

DISCLOSURE

Technical Problem

An aerosol-generating device heats an aerosol-generating article through a heater, and a user puffs aerosol via the heated aerosol-generating article. The user may hold the aerosol-generating device by hand for use. In this case, heat radiated from the heater of the aerosol-generating device may be unsafely transferred to the user.

An aerosol-generating device in the related art does not include a heat-dissipating structure that prevents the heat radiated by the heater from being delivered to the user, or uses a portion of the housing as a heat-dissipating structure. Accordingly, without proper thermal insulation, heat radiated from the heater of the aerosol-generating device is unsafely transferred to a hand of the user holding the aerosol-generating device and the user may feel the heat.

To overcome the shortcomings of the above-described aerosol-generating device in the related art, embodiments provide an aerosol-generating device including a heat-dissipating structure and an aerosol-generating system.

Technical goals to be achieved with reference to the embodiments are not limited to the above-described coals, and the goals that are not mentioned will be clearly understood by one of ordinary skill in the art from the present specification and the accompanying drawings.

Technical Solution

An aerosol-generating device according to an embodiment may include a housing having an opening configured to receive an aerosol-generating article; an accommodating space configured to accommodate the aerosol-generating article inserted through the opening; a heat-dissipating structure comprising an inner wall forming the accommodating space, and an outer wall surrounding the inner wall such that an inner space is formed between the inner wall and the outer wall; and a coil arranged between the outer wall and the housing, and configured to generate an induced magnetic field, wherein the inner wall is configured to generate heat by the induced magnetic field generated from the coil.

An aerosol-generating device according to another embodiment include a housing having an opening configured to receive an aerosol-generating article; an accommodating space configured to accommodate the aerosol-generating article inserted through the opening; a heat-dissipating structure comprising an inner wall and an outer wall that surrounds the inner wall such that an inner space is formed between the inner wall and the outer wall; a coil arranged in the heat-dissipating structure and configured to generate an induced magnetic field; and a susceptor configured to generate heat based on the induced magnetic field, and arranged to surround the accommodating space such that the coil is disposed between the susceptor and the inner wall.

Advantageous Effects

A heat-dissipating structure of an aerosol-generating device regarding embodiments includes an inner wall and an outer wall, wherein the inner wall of the heat-generating structure is formed as a susceptor and may heat the aerosol-generating article. Embodiments may generate the aerosol-generating article without an additional heater by configuring the inner wall of the heat-dissipating structure as the susceptor. Accordingly, an inner space of the aerosol-generating device may be efficiently used.

The heat-dissipating structure may form a vacuum inner space between the inner wall and the outer wall. The vacuum inner space formed between the inner wall and the outer wall may efficiently prevent the heat from being transferred from the inner wall to the outer wall. Accordingly, transfer of the heat generated from the susceptor to the user may be effectively prevented.

Effects of the embodiments are not limited to the above-described effects, and effects that are not described will be clearly understood by those skilled in the art to which the present disclosure belongs from the present specification and the accompanying drawings.

BEST MODE

Figure 1:
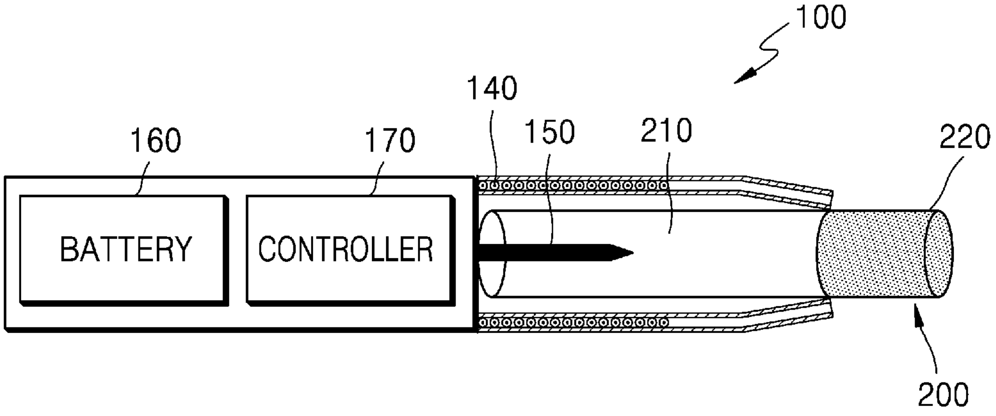
FIG. 1 is a diagram showing an example in which an aerosol-generating article is inserted into an aerosol-generating device.

According to an embodiment, an aerosol-generating device may include: a housing having an opening configured to receive an aerosol-generating article; an accommodating space configured to accommodate the aerosol-generating article inserted through the opening; a heat-dissipating structure comprising an inner wall forming the accommodating space, and an outer wall surrounding the inner wall such that an inner space is formed between the inner wall and the outer wall; and a coil arranged between the outer wall and the housing, and configured to generate an induced magnetic field, wherein the inner wall is configured to generate heat by the induced magnetic field generated from the coil.

The heat-dissipating structure may have an upper wall and a lower wall which connect the outer wall and the inner wall, and the inner space of the heat-dissipating structure may be a vacuum space such that heat is prevented from being transferred from the inner wall to the outer wall.

The inner wall may include an extending portion extending into each of the upper wall and the lower wall.

The extending portion may be formed along a circumference direction of the upper wall and the lower wall.

The extending portion may include a portion extending in a longitudinal direction that is a direction in which the aerosol-generating article is inserted.

The lower wall may cover a gap between the inner wall and the outer wall at a bottom of the heat-dissipating structure.

A vacuum space may be formed in the lower wall to prevent the heat generated by the inner wall from being transferred through the lower wall.

The outer wall of the heat-dissipating structure may be made of a non-metal material.

According to another embodiment, an aerosol-generating device may include: a housing having an opening configured to receive an aerosol-generating article; an accommodating space configured to accommodate the aerosol-generating article inserted through the opening; a heat-dissipating structure comprising an inner wall and an outer wall that surrounds the inner wall such that an inner space is formed between the inner wall and the outer wall; a coil arranged in the heat-dissipating structure and configured to generate an induced magnetic field; and a susceptor configured to generate heat based on the induced magnetic field, and arranged to surround the accommodating space such that the coil is disposed between the susceptor and the inner wall.

The heat-dissipating structure may have an upper wall and a lower wall which connect the outer wall and the inner wall, and the inner space of the heat-dissipating structure may be a vacuum space such that heat is prevented from being transferred from the inner wall to the outer wall.

The lower wall may be formed to cover a gap between the inner wall and the outer wall at a bottom of the heat-dissipating structure.

A vacuum space may be formed in the lower wall such that heat is prevented from being transferred from the susceptor to the lower wall.

A through hole through which a wire passes may be formed in the lower wall, and the coil may be electrically connected to a controller of the aerosol-generating device through the wire.

The heat-dissipating structure may include a paramagnetic metal configured to block the induced magnetic field generated from the coil.

According to another embodiment, an aerosol-generating system may include the above-described aerosol-generating device; and an aerosol-generating article accommodated in the aerosol-generating device.

MODE FOR INVENTION

With respect to the terms in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word “comprise” and variations such as “comprises” or “comprising” will be understood to imply the inclusion of stated elements but not the exclusion of any other elements. In addition, the terms “-er”, “-or”, and “module” described in the specification mean units for processing at least one function and operation and can be implemented by hardware components or software components and combinations thereof.

As used herein, expressions such as “at least one of,” when preceding a list of elements, modify the entire list of elements and do not modify the individual elements of the list. For example, the expression, “at least one of a, b, and c,” should be understood as including only a, only b, only c, both a and b, both a and c, both b and c, or all of a, b, and c.

It will be understood that when an element or layer is referred to as being “over,” “above,” “on,” “connected to” or “coupled to” another element or layer, it can be directly over, above, on, connected or coupled to the other element or layer or intervening elements or layers may be present. In contrast, when an element is referred to as being “directly over,” “directly above,” “directly on,” “directly connected to” or “directly coupled to” another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIG. 1 is a diagram showing an example in which an aerosol-generating article is inserted into an aerosol-generating device.

Referring to FIG. 1, the aerosol-generating device 100 may include a coil 140, a susceptor 150, a battery 160, and a controller 170. Also, an aerosol-generating article 200 may be inserted into an inner space of the aerosol-generating device 100.

FIG. 1 only illustrates certain components of the aerosol-generating device 100, which are related to the present embodiment. Therefore, it will be understood by one of ordinary skill in the art related to the present embodiment that other components may be further included in the aerosol-generating device 100, in addition to the components illustrated in FIG. 1.

FIG. 1 illustrates that the battery 160, the controller 170, and the susceptor 150 are arranged in series. But, the embodiments are not limited to the structure shown in FIG. 1. In other words, according to the design of the aerosol-generating device 100, the battery 160, the controller 170, and the susceptor 150 may be differently arranged.

When the aerosol-generating article 200 is inserted into the aerosol-generating device 100, the aerosol-generating device 100 may heat the aerosol-generating article 200 by an induction heating method. The temperature of aerosol generating material within the aerosol-generating article 200 increases by heated susceptor 150, and as a result, generates aerosol. The aerosol generated from aerosol-generating article 200 is delivered to a user by passing through a filter rod 220 of the aerosol-generating article 200, which will be described later. According to necessity, even when the aerosol-generating article 200 is not inserted into the aerosol-generating device 100, the aerosol-generating device 100 may heat the susceptor 150.

The induction heating method may refer to a method of generating heat from a magnetic body by applying an alternating magnetic field that periodically changes its direction such that the magnetic body generates heat due to an external magnetic field. A magnetic body that generates heat due to an external magnetic field may be a susceptor. The susceptor may be arranged in the aerosol-generating article in a shape of a piece, flake or strip. Also, the susceptor may be arranged in the aerosol-generating device 100 instead of being included in the aerosol-generating article.

Referring to FIG. 1, the coil 140 of the aerosol-generating device 100 may be wound around an accommodation space, where the aerosol-generating article is received, and generates an induced magnetic field. The susceptor 150 is located on a position corresponding to a position of the coil and heated by the induced magnetic field generated by the coil 140.

When an alternating magnetic field is applied to a magnetic body, energy loss due to eddy current loss and hysteresis loss may occur in the magnetic body, and the lost energy may be released from the magnetic body as thermal energy. As an amplitude or a frequency of the alternating magnetic field applied to the magnetic body increases, more heat energy may be released from the magnetic body. The aerosol-generating device 100 may release thermal energy from a magnetic body by applying an alternating magnetic field to the magnetic material and may transmit the thermal energy released from the magnetic body to the aerosol-generating article 200.

According to embodiments, the susceptor may include metal or carbon. The susceptor 150 may include at least one of ferrite, ferromagnetic alloy, stainless steel, and aluminum (Al). In addition, the susceptor 150 may include at least one of a ceramic such as graphite, molybdenum, silicon carbide, niobium, nickel alloy, metal film, or zirconia, a transition metal such as nickel (Ni) or cobalt (Co), and a metalloid such as boron (B) or phosphorus (P).

As the susceptor 150 is provided in the aerosol-generating device 100 rather than an inside of a cigarette, there may be various advantages. For example, when a susceptor material is not uniformly distributed inside the cigarette, a problem may be solved in which an aerosol and flavor are generated non-uniformly. In addition, the susceptor 150 is provided in the aerosol-generating device 100, and thus, a temperature of the susceptor 150 that generates heat by induction heating may be directly measured and provided to the aerosol-generating device 100, and accordingly, the temperature of the susceptor 150 may be precisely controlled.

The coil 140, which will be explained hereinafter, may receive power from the battery 160. The controller 170 of the aerosol-generating device 100 may generate a magnetic field by controlling an electrical current flowing through the coil 140, and an induced electrical current may be generated in the susceptor 150 due to an influence of the magnetic field. Such an induction heating phenomenon is a known phenomenon that may be explained by Faraday's Law of induction and Ohm's Law, and refers to a phenomenon in which an alternating electric field is generated in the conductor when the conductor is in an alternating magnetic field.

As such, if an electric field is generated in a conductor, an eddy current flows in the conductor according to Ohm's law, and the eddy current generates heat proportional to current density and conductor resistance.

In other words, when power is supplied to the coil 140, a magnetic field may be generated inside the coil 140. When an alternating current is applied to the coil 140 from the battery 160, the magnetic field formed inside the coil 140 may change its direction periodically. When the susceptor 150 is disposed inside the coil 140 and exposed to an alternating magnetic field that periodically changes its direction, the susceptor 150 generates heat and heats the aerosol-generating article 200 accommodated in the aerosol-generating device 100.

When the alternating magnetic field formed by the coil 140 changes in amplitude or frequency, the susceptor 150 that heats the aerosol-generating article 200 may also change in temperature. The controller 170 may control the power supplied to the coil 140 to adjust the amplitude or the frequency of the alternating magnetic field formed by the coil 140, and thus, the temperature of the susceptor 150 may be controlled.

For example, the coil 140 may be implemented as a solenoid. A material of a wire used for the solenoid may be copper (Cu). However, the material is not limited thereto, and any one of silver (Ag), gold (Au), aluminum (Al), tungsten (W), zinc (Zn), and nickel (Ni), or an alloy containing at least one of the materials will be used as a material of a wire used for a solenoid as a material with a low resistance value to allow a high current to flow.

The battery 160 may supply power to be used for the aerosol-generating device 100 to operate. For example, the battery 160 may supply power to the coil in order to heat the susceptor 150, and may supply power for operating the controller 170. Also, the battery 160 may supply power for operations of a display, a sensor, a motor, and etc. mounted in the aerosol-generating device 100.

The controller 170 may generally control operations of the aerosol-generating device 100. For example, the controller 170 may control power supplied to the coil 140. In detail, the controller 170 may control not only operations of the battery 160, but also operations of other components included in the aerosol-generating device 100. Also, the controller 170 may check a state of each of the components of the aerosol-generating device 100 to determine whether or not the aerosol-generating device 100 is able to operate.

The controller 170 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The susceptor 150 is shown to be inserted inside the aerosol-generating article 200 in FIG. 1, but is not limited thereto. For example, the susceptor 150 may include a tube-type heating element, a plate-type heating element, a needle-type heating element, or a rod-type heating element, and may heat the inside or the outside of the aerosol-generating article 200, according to the shape of the heating element.

Also, the aerosol-generating device 100 may include a plurality of susceptor 150. Here, the plurality of susceptor 150 may be inserted into the aerosol-generating article 200 or may be arranged outside the aerosol-generating article 200. Also, some of the plurality of susceptor 150 may be inserted into the cigarette 200, and the others may be arranged outside the cigarette 200. In addition, the shape of the susceptor 150 is not limited to the shape illustrated in FIG. 1 and may include various shapes.

The aerosol-generating device 100 may further include other components in addition to the coil 140, the battery 160, the controller 170, and the susceptor 150. For example, the aerosol-generating device 100 may include a display capable of outputting visual information and/or a motor for outputting haptic information. Also, the aerosol-generating device 100 may include at least one sensor (e.g., a puff detecting sensor, a temperature detecting sensor, an aerosol-generating article insertion detecting sensor, etc.).

Also, the aerosol-generating device 100 may be formed such that external air may be introduced or internal air may be discharged even when the aerosol-generating article 200 is inserted into the aerosol-generating device 100.

Although not illustrated in FIG. 1, the aerosol-generating device 100 and an additional cradle may form together a system. For example, the cradle may be used to charge the battery 160 of the aerosol-generating device 100. Also, the susceptor 150 may be heated when the cradle and the aerosol-generating device 100 are coupled to each other.

The aerosol-generating article 200 may be similar to a general combustive aerosol-generating article such as a general cigarette. For example, the aerosol-generating article 200 may be divided into a first portion 210 including an aerosol generating material and a second portion 220 including a filter, etc. Alternatively, the second portion 220 of the aerosol-generating article 200 may also include an aerosol generating material. For example, an aerosol generating material made in the form of granules or capsules may be inserted into the second portion 220.

The entire first portion 210 may be inserted into the aerosol-generating device 100, and the second portion 220 may be exposed to the outside. Alternatively, only a portion of the first portion 210 may be inserted into the aerosol-generating device 100, or the entire first portion 210 and a portion of the second portion 220 may be inserted into the aerosol-generating device 100. The user may breathe in aerosols while holding the second portion 220 by the mouth of the user. In this case, the aerosol is generated from the external air passing through the first portion 210, and the generated aerosol passes through the second portion 220 and is delivered to the user's mouth.

For example, the external air may flow into at least one air passage formed in the aerosol-generating device 100. For example, the opening and closing and/or a size of the air passage formed in the aerosol-generating device 100 may be adjusted by the user. Accordingly, the amount of smoke and a smoking feeling may be adjusted by the user. As another example, the external air may flow into the aerosol-generating article 200 through at least one hole formed in a surface of the aerosol-generating article 200.

Hereinafter, an example of the aerosol-generating article 200 will be described with reference to FIG. 2.

Figure 2:
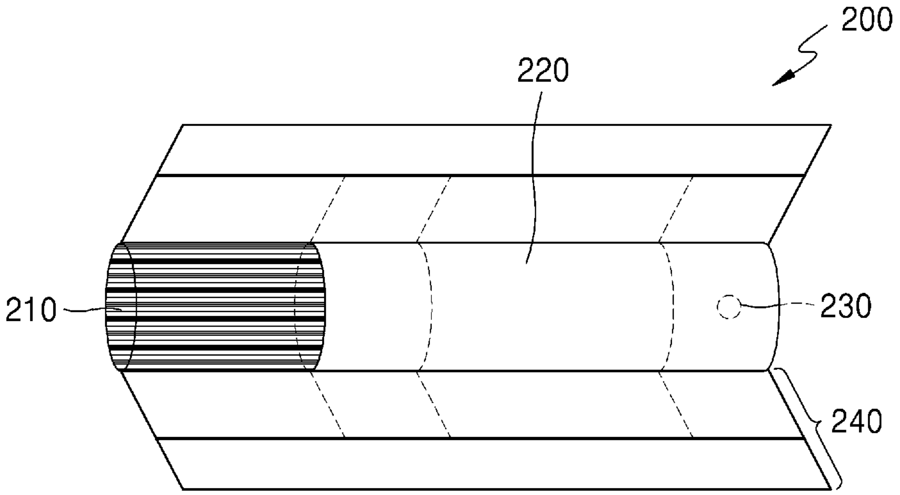
FIG. 2 illustrates an example of the aerosol-generating article.

FIG. 2 illustrates an example of an aerosol-generating article.

Referring to FIG. 2, the aerosol-generating article 200 may include a tobacco rod 210 and a filter rod 220. The first portion 210 described above with reference to FIG. 1 may include the tobacco rod 210, and the second portion 220 may include the filter rod 220.

FIG. 2 illustrates that the filter rod 220 includes a single segment. However, the filter rod 220 is not limited thereto. In other words, the filter rod 220 may include a plurality of segments. For example, the filter rod 220 may include a first segment configured to cool an aerosol and a second segment configured to filter a certain component included in the aerosol. Also, as necessary, the filter rod 220 may further include at least one segment configured to perform other functions.

The aerosol-generating article 200 may be packaged by at least one wrapper 240. The wrapper 240 may have at least one hole through which external air may be introduced or internal air may be discharged. For example, the aerosol-generating article 200 may be packaged by one wrapper 240. As another example, the aerosol-generating article 200 may be doubly packaged by at least two wrappers 240. For example, the tobacco rod 210 may be packaged by a first wrapper, and the filter rod 220 may be packaged by a second wrapper. Also, the tobacco rod 210 and the filter rod 220, which are respectively packaged by separate wrappers, may be coupled to each other, and the entire aerosol-generating article 200 may be packaged by a third wrapper. When each of the tobacco rod 210 and the filter rod 220 includes a plurality of segments, each segment may be packaged by a separate wrapper. Also, the entire aerosol-generating article 200 including the plurality of segments, which are respectively packaged by the separate wrappers, coupled to each other, and re-packaged by another wrapper.

The tobacco rod 210 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 210 may include other additives, such as flavors, a wetting agent, and/or organic acid. Also, the tobacco rod 210 may include a flavored liquid, such as menthol or a moisturizer, which is injected to the tobacco rod 210.

The tobacco rod 210 may be manufactured in various forms. For example, the tobacco rod 210 may be formed as a sheet or a strand. Also, the tobacco rod 210 may be formed as a pipe tobacco, which is formed of tiny bits cut from a tobacco sheet. Also, the tobacco rod 210 may be surrounded by a heat conductive material. For example, the heat-conducting material may be, but is not limited to, a metal foil such as aluminum foil. For example, the heat conductive material surrounding the tobacco rod 210 may uniformly distribute heat transmitted to the tobacco rod 210, and thus, the heat conductivity applied to the tobacco rod may be increased and taste of the tobacco may be improved. Also, the heat conductive material surrounding the tobacco rod 210 may function as a susceptor heated by the induction heater. Here, although not illustrated in the drawings, the tobacco rod 210 may further include an additional susceptor, in addition to the heat conductive material surrounding the tobacco rod 210.

The filter rod 220 may include a cellulose acetate filter. Shapes of the filter rod 220 are not limited. For example, the filter rod 220 may include a cylinder-type rod or a tube-type rod having a hollow inside. Also, the filter rod 220 may include a recess-type rod. When the filter rod 220 includes a plurality of segments, at least one of the plurality of segments may have a different shape.

The filter rod 220 may be formed to generate flavors. For example, a flavoring liquid may be injected onto the filter rod 220, or an additional fiber coated with a flavoring liquid may be inserted into the filter rod 220.

Also, the filter rod 220 may include at least one capsule 230. Here, the capsule 230 may generate a flavor or an aerosol. For example, the capsule 230 may have a configuration in which a liquid containing a flavoring material is wrapped with a film. For example, the capsule 230 may have a spherical or cylindrical shape, but is not limited thereto.

When the filter rod 220 includes a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above-described example and is not limited as long as the cooling segment cools the aerosol.

Figure 3:
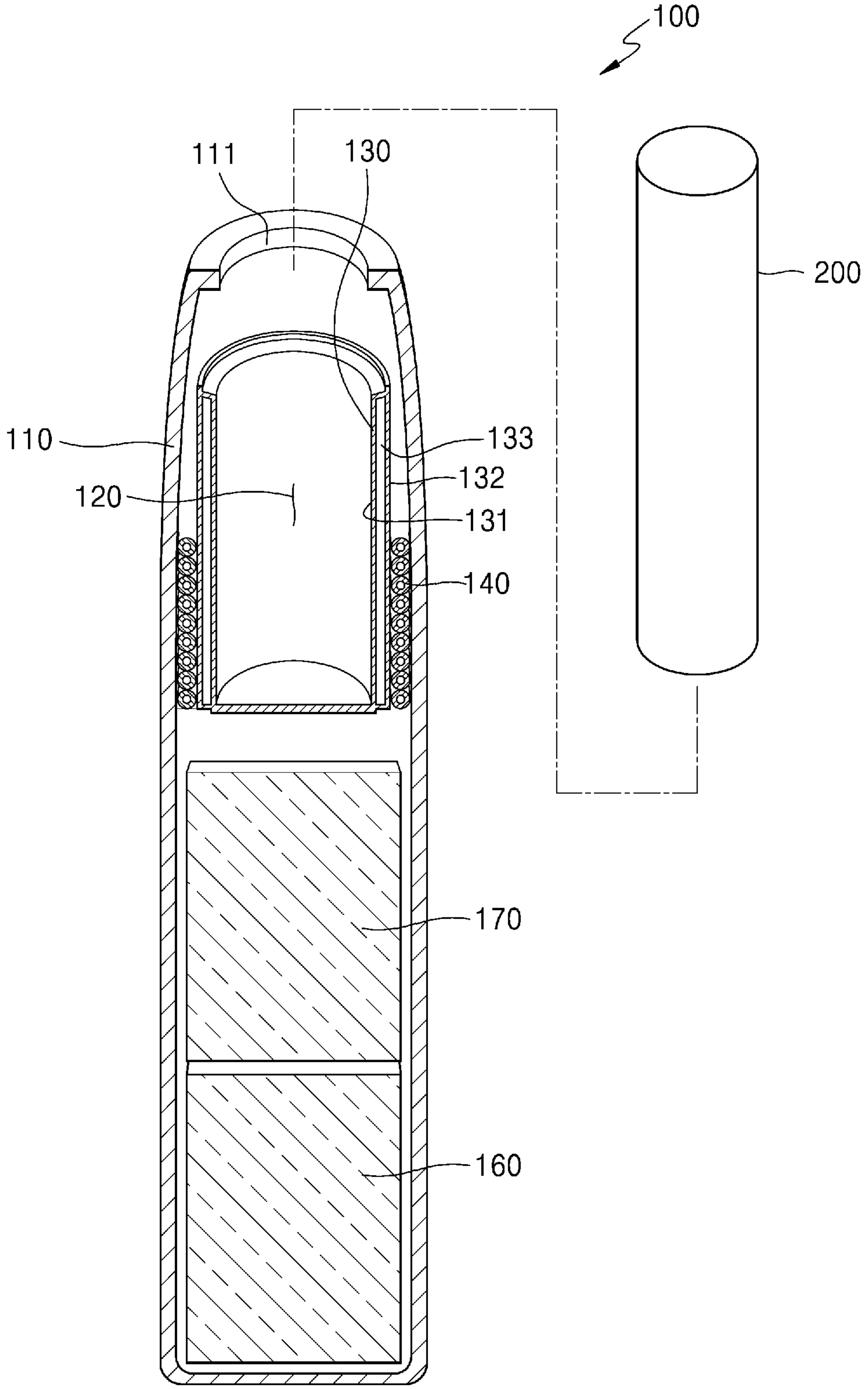
FIG. 3 is a perspective view of a cross-section of an aerosol-generating device according to an embodiment.

FIG. 3 is a perspective view of a cross-section of an aerosol-generating device according to another embodiment. Hereinafter, detailed description in a range overlapping with the above description will be omitted.

Referring to FIG. 3, the aerosol-generating device 100 includes a housing 110, an accommodating space 120, a heat-dissipating structure 130, and a coil 140.

The housing 110 of the aerosol-generating device 100 includes an opening 111 through which the aerosol-generating article 200 is inserted. The accommodating space 120 capable of accommodating the aerosol-generating article 200 that is inserted through the opening 111 is formed in the housing 110.

In the embodiment illustrated in FIG. 3, the heat-dissipating structure 130 has a cylindrical shape, and is arranged to surround the aerosol-generating article 200 when the aerosol-generating article 200 is accommodated in the accommodating space 120. However, a shape of the heat-dissipating structure 130 is not limited to the above description, and may have other suitable shapes for accommodating the aerosol-generating article 200. For example, the heat-dissipating structure 130 may be a pipe shape having a polygon-shaped cross-section or an oval-shaped cross-section.

The heat-dissipating structure 130 may include a double-wall structure having an inner wall 131 and an outer wall 132. However, a wall structure of the heat-dissipating structure 130 is not limited thereto and may include a different multi-wall structure according to embodiments. Referring to FIG. 3, the heat-dissipating structure 130 may include the inner wall 131 that forms the accommodating space 120, and the outer wall 132 that is arranged outside the inner wall 131. Accordingly, an inner space 133 may be formed between the inner wall 131 and the outer wall 132 of the heat-dissipating structure 130.

The coil 140 is arranged between the housing 110 and the outer wall 132, and as described above, the coil 140 may receive an alternating current from the battery 160 under control of the controller 170 and generate an alternating magnetic field.

Figure 4:
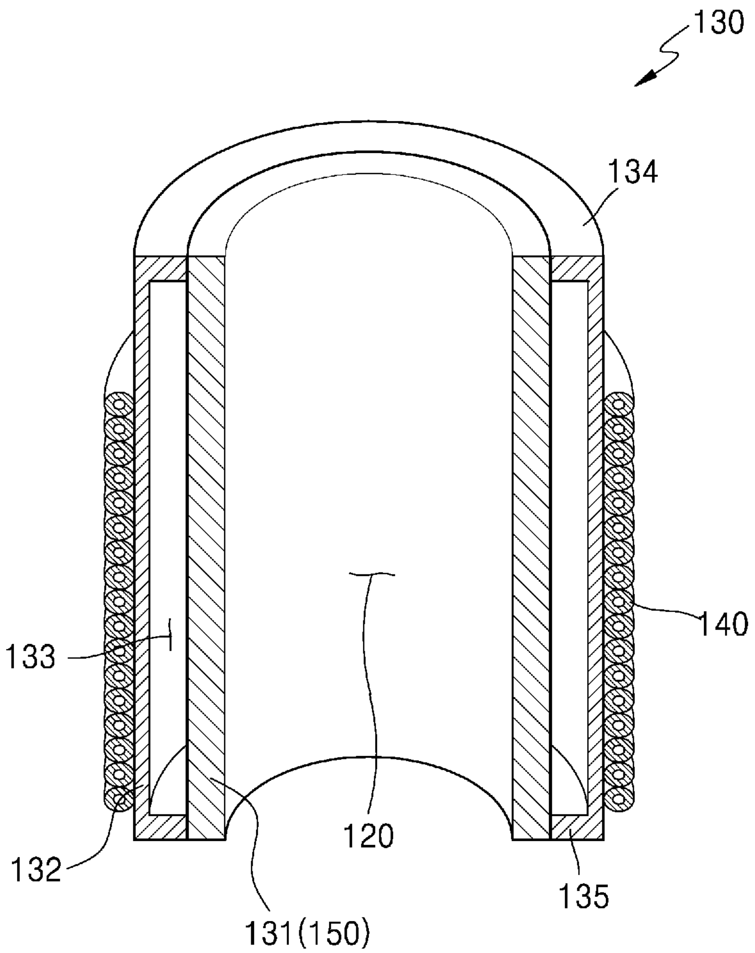
FIG. 4 is a perspective view of a cross-section of a heat-dissipating structure shown in FIG. 3.

FIG. 4 is a perspective view of a cross-section of the heat-dissipating structure shown in FIG. 3.

The heat-dissipating structure 130 of the aerosol-generating device 100 according to an embodiment will be described in more detail with reference to FIG. 4.

In the embodiment illustrated in FIG. 4, the inner wall 131 of the heat-dissipating structure 130 may be the susceptor 150 configured to generate heat by the induced magnetic field generated from the coil 140. Accordingly, the inner wall 131 may heat the aerosol-generating article 200. For example, the inner wall 131 of the heat-dissipating structure 130 may contact the surface of the aerosol-generating article 200 when the aerosol-generating article 200 is accommodated in the aerosol-generating device 100, and the inner wall 131 may heat the accommodated aerosol-generating article 200 by generating heat by the induced magnetic field generated from the coil 140.

As described above, to function as the susceptor 150, the inner wall 131 may include metal or carbon, and may preferably include a ferromagnetic metal.

In addition, the outer wall 132 may be made of a non-metal material. It may be problematic if the outer wall 132 includes a ferromagnetic metal, because the outer wall 132 may radiate heat together with the inner wall 131 due to the coil 140 arranged outside of the outer wall 132. Also, if the outer wall includes a paramagnetic metal, the outer wall 132 may block the induced magnetic field generated from the coil 140, and therefore, the inner wall 131 may not radiate heat properly. Therefore, to prevent occurrence of the above-described situation, the outer wall 132 may be made of a non-metal material, such as plastic, that is not affected by the induced magnetic field.

In addition, the heat-dissipating structure 130 may include an upper wall 134 and a lower wall 135, which connect the inner wall 131 and the outer wall 132. The inner space 133 formed by the inner wall 131, the outer wall 132, the upper wall 134, and the lower wall 135 of the heat-dissipating structure 130 may form a vacuum space. Therefore, heat delivery through the inner space 133 is effectively prohibited, and thus, heat generated from the inner wall 131 may be prevented from being delivered to the outside of the outer wall 132.

To keep the inner space 133 of the heat-dissipating structure 130 in a vacuum state, the inner wall 131, the outer wall 132, the upper wall 134, and the lower wall 135 of the heat-dissipating structure 130 may be tightly coupled with one another. For example, the outer wall 132, the upper wall 134, and the lower wall 135 may be integrally formed and tightly coupled with the inner wall 131. However, the heat-dissipating structure 130 is not limited to the above description. For example, the inner wall 131, the outer wall 132, the upper wall 134, and the lower wall 135 may be separately formed and then tightly coupled with one another.

Hereinafter, a process of manufacturing the walls of the heat-dissipating structure 130 will be illustratively described. First, the inner wall 131 is formed. Then, the inner wall 132, the upper wall 134, and the lower wall 135 are integrally formed by an injection molding process. Next, the heat-dissipating structure 130 may be formed by coupling the inner wall 132, the upper wall 134, and the lower wall 135, which are integrally formed, with the inner wall 131 by a sintering process. However, a manufacturing process of the heat-dissipating structure 130 is not limited to the above description, and one of ordinary skill may modify the process based on a material of each of the inner wall 131, the outer wall 132, the upper wall 134, and the lower wall 135.

Figure 5:
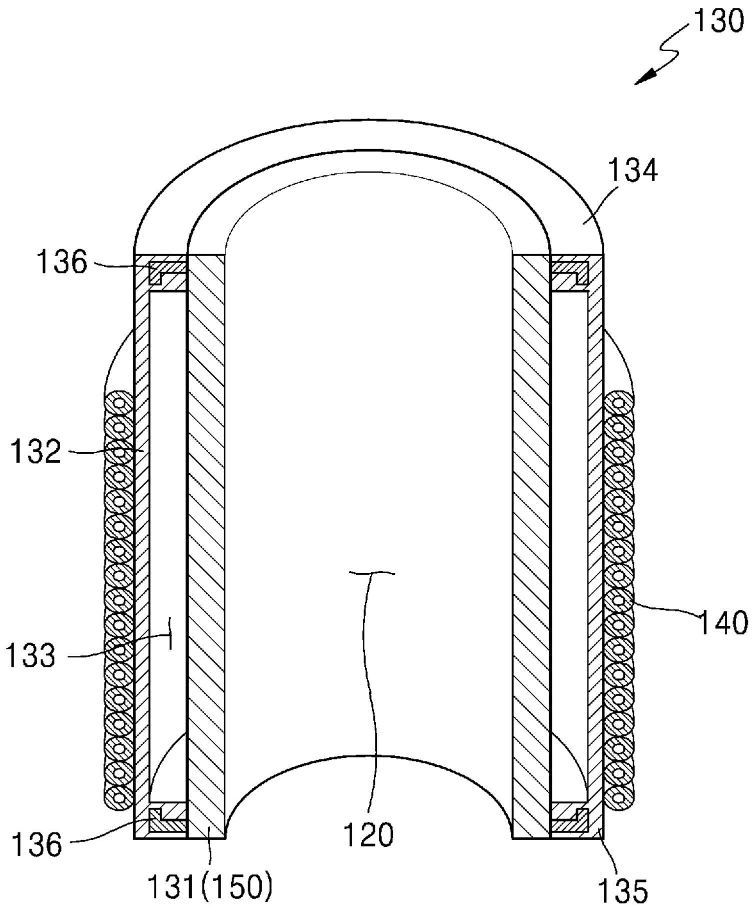
FIG. 5 is a perspective view of a cross-section of a heat-dissipating structure according to another embodiment.

FIG. 5 is a perspective view of a cross-section of a heat-dissipating structure according to another embodiment.

Referring to FIG. 5, the inner wall 131 of the heat-dissipating structure 130 may include an extending portion 136 extending into each of the upper wall 134 and the lower wall 135. The extending portion 136 may be formed to extend outward from the outside of the inner wall 131 and to be inserted into each of the upper wall 134 and the lower wall 135.

Each extending portion 136 may make coupling between the upper wall 134 and the inner wall 131 and between the lower wall 135 and the inner wall 131 more tight. For example, after the extending portion 136 extending outward from the inner wall 131 is formed, and then the outer wall 132, the upper wall 134, and the lower wall 135 are formed. Then, the upper wall 134 and the lower wall 135 may each be tightly coupled with the inner wall 131 by sintering process.

For example, after the extending portion 136 is formed on the inner wall 131, the outer wall 132, the upper wall 134, and the lower wall 135 may be formed by injection molding process, and coupling portions may be tightly coupled.

The extending portion 136 may have a portion extending in a longitudinal direction that is a direction in which the aerosol-generating article 200 is inserted. That is, the extending portion 136 formed in each of the upper wall 134 and the lower wall 135 may extend in the longitudinal direction that is the direction in which the aerosol-generating article 200 is inserted. In this case, the extending portion 136 may have a preset length in the inner wall 131, and the preset length may be modified according to design and necessity.

The extending portion 136 may be formed on the inner surface of the upper wall 134 and the lower wall 135, along a circumference direction of the upper wall 134 and the lower wall 135. That is, the extending portion 136 may be formed to surround the inner wall 131 along the circumference direction of the inner wall 131. In addition, the extending portion 136 may be formed to surround the entire circumference of the inner wall 131 or only a portion of the circumference of the inner wall 131. For example, the extending portion 136 may be arranged at a portion of the inner wall 131 such that the extending portion 136 surrounds a portion of the circumference of the inner wall 131.

A shape of the extending portion 136 is not limited to the above description. For example, although not shown in FIG. 5, a bent portion may be formed at an end portion of the extending portion 136 such the extending portion 136 may have opposite walls that face each other. As such, a long portion of the extending portion 136 may extend in the upper wall 134 and the lower wall 135 through the bent portion and the opposite walls, and the inner wall 131, the upper wall 134, and the upper wall 135 may be coupled with one another more tightly. The arrangement and lengths of the bent portion and the opposite walls of the extending portion 136 are not limited thereto and may be modified according to embodiments.

Figure 6:
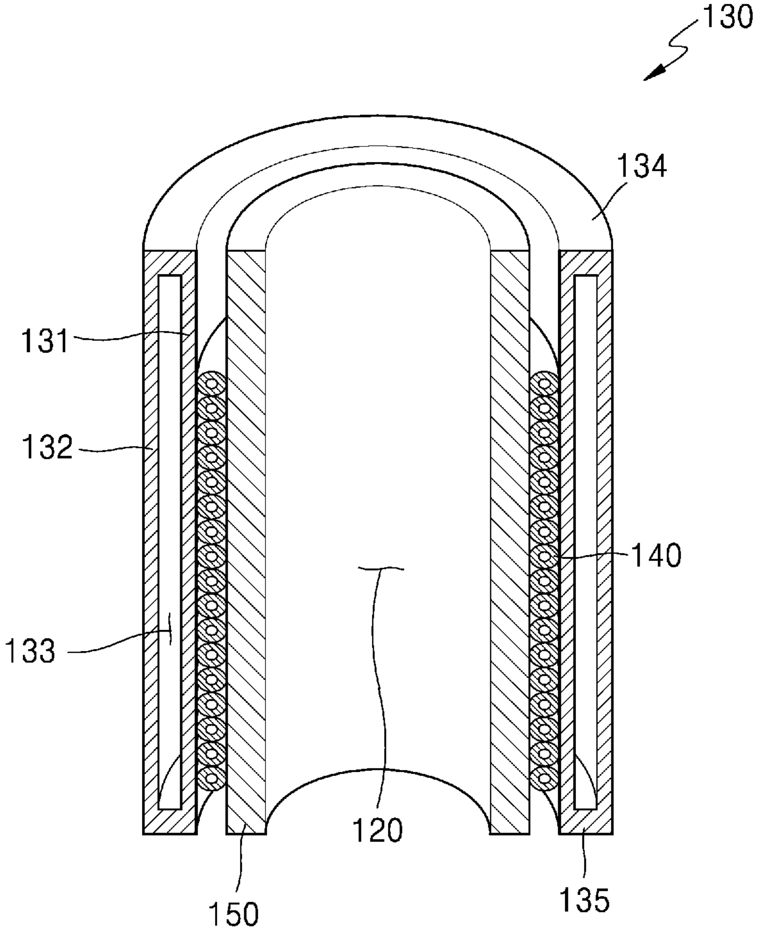
FIG. 6 is a perspective view of a cross-section of a heat-dissipating structure according to another embodiment.

FIG. 6 is a perspective view of a cross-section of a heat-dissipating structure of an aerosol-generating device according to another embodiment.

Referring to FIG. 6, the coil 140 and the susceptor 150 may be arranged in the heat-dissipating structure 130. The accommodating space 120 capable of accommodating the aerosol-generating article 200 is formed in the susceptor 150, and the susceptor 150 may be arranged to surround the aerosol-generating article 200 when the aerosol-generating article 200 is accommodated in the accommodating space 120. The coil 140 may be arranged between the inner wall 131 of the heat-dissipating structure 130 and the susceptor 150. Accordingly, the susceptor 150 may contact the aerosol-generating article 200 when the aerosol-generating article 200 is accommodated in the accommodating space 120, and the susceptor 150 may heat the accommodated aerosol-generating article 200 by generating heat by the induced magnetic field that is generated from the coil 140. In the embodiment illustrated in FIG. 6, the coil 140 and the susceptor 150 may be arranged to be adjacent to each other, and thus, heating efficiency may be improved.

The heat-dissipating structure 130 may include the upper wall 134 and the lower wall 135 which connect the inner wall 131 and the outer wall 132. The inner space 133 formed by the inner wall 131, the outer wall 132, the upper wall 134, and the lower wall 135 of the heat-dissipating structure 130 may form a vacuum space. Therefore, heat delivery through the inner space 133 is restricted, and thus, the heat generated from the susceptor 150 may be prevented from being delivered to the outside of the heat-dissipating structure 130.

To keep the inner space 133 of the heat-dissipating structure 130 in a vacuum state, the inner wall 131, the outer wall 132, the upper wall 134, and the lower wall 135 of the heat-dissipating structure 130 may be air-tightly coupled with one another. Here, the vacuum state may refer to a relative vacuum state of having relatively less air amount compared to surroundings or refer to an absolute vacuum state of having no air. For example, the inner wall 131, the outer wall 132, the upper wall 134, and the lower wall 135 of the heat-dissipating structure 130 may be integrally formed.

For example, the inner wall 131, the outer wall 132, the upper wall 134, and the lower wall 135 of the heat-dissipating structure 130 may include a paramagnetic metal including stainless steel, aluminum, potassium, sodium, platinum, and the like. Accordingly, the heat-dissipating structure 130 may prevent the heat generated by the susceptor 150 from being delivered to outside of the heat-dissipating structure 131, and at the same time, may prevent the induced magnetic field, which is generated by the coil 140, from being delivered to outside of the heat-dissipating structure 130. In addition, when the entire heat-dissipating structure 130 is made of a paramagnetic metal, rigidity is greater than in a case where the heat-dissipating structure 130 includes a non-metal material.

Figure 7A:
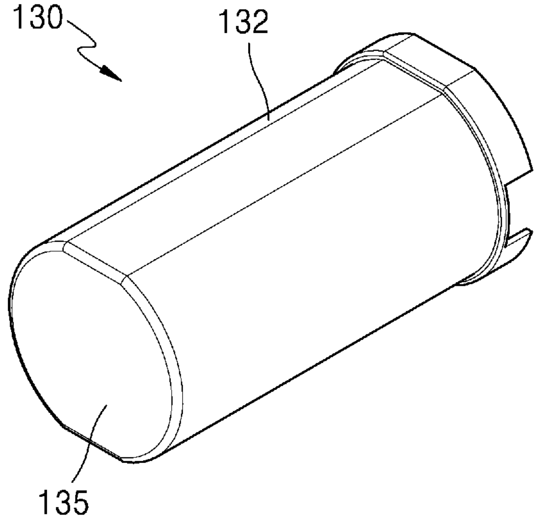
FIG. 7A is an illustrative perspective view of a heat-dissipating structure according to an embodiment.

FIG. 7A is perspective view of a heat-dissipating structure according to an embodiment.

Referring to FIG. 7A, the heat-dissipating structure 130 may have a cup shape with a closed bottom. For example, the lower wall 135 of the heat-dissipating structure 130 may close a gap between the inner wall 131 and the outer wall 132 at the bottom opposite the opening through which the aerosol-generating article 200 is inserted.

Although not illustrated in FIG. 7A, the lower wall 135 of the heat-dissipating structure 130 may have a multi-wall structure. For example, the lower wall 135 may include a double-wall structure, and a vacuum space may be formed in the lower wall 135 to prevent the heat generated by the susceptor 150 from being transferred through the lower wall 135. Accordingly, the lower wall 135 may prevent the heat from being delivered to internal components (for example, the battery 160 and the controller 170) of the aerosol-generating device 100, and thus, operational reliability may be improved.

Figure 7B:
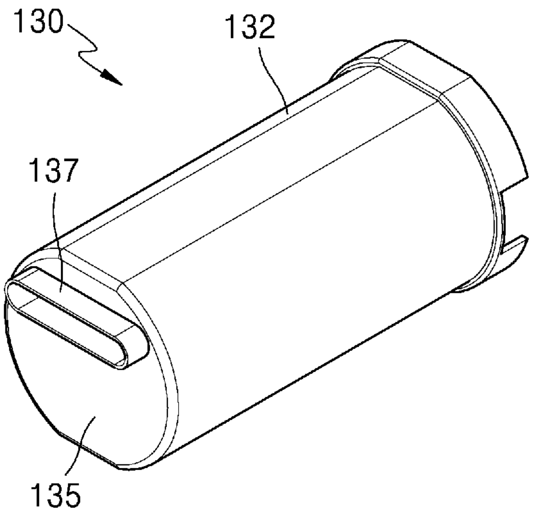
FIG. 7B is another illustrative perspective view of a heat-dissipating structure according to another embodiment.

FIG. 7B is another illustrative cross-sectional view of the heat-dissipating structure according to another embodiment.

Referring to FIG. 7B, a through hole 137 may be formed in the inner wall 135 of the heat-dissipating structure 130 having a cup shape. A wire may pass through the through hole of the lower wall 135. Accordingly, an element (for example, the coil 140) arranged in the inner wall of the heat-dissipating structure 130 may be electrically connected to the controller 170 and may receive power through the wire.

Although not illustrated in FIG. 7B, a vacuum space may be formed in the lower wall 135 to prevent the heat generated by the susceptor 150 from passing through the lower wall 135, like in the embodiment in FIG. 7A. In this case, the vacuum space in the lower wall 135 may be formed in regions other than the region in which the through hole 137 is formed. For example, when the through hole 137 is formed in a center region of the inner wall 135, the vacuum space in the lower wall 135 may be formed in a ring shape. As another example, when a position of the through hole 137 is biased toward one side of the inner wall, a position of the vacuum space in the inner wall 135 may be formed to be biased toward another side.

At least one of the components, elements, modules or units (collectively "components" in this paragraph) represented by a block in the drawings such as the controller 170 may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Those of ordinary skill in the art related to the present embodiments may understand that various changes in form and details can be made therein without departing from the scope of the characteristics described above. The disclosed methods should be considered in descriptive sense only and not for purposes of limitation. The scope of the present disclosure is defined by the appended claims rather than by the foregoing description, and all differences within the scope of equivalents thereof should be construed as being included in the present disclosure.

INDUSTRIAL APPLICABILITY

Embodiments relate to an aerosol-generating device including a heat-dissipating structure capable of preventing damage that may occur as heat is delivered to outside of the device while an aerosol-generating article is heated, and an aerosol-generating system including the aerosol-generating device.

The invention claimed is:

1. An aerosol-generating device comprising:

a housing having an opening configured to receive an aerosol-generating article;

an accommodating space configured to accommodate the aerosol-generating article inserted through the opening;

a heat-dissipating structure comprising an inner wall forming the accommodating space, and an outer wall surrounding the inner wall such that an inner space is formed between the inner wall and the outer wall; and a coil arranged between the outer wall and the housing, and configured to generate an induced magnetic field, wherein the inner wall is configured to generate heat based on the induced magnetic field, wherein the heat-dissipating structure has an upper wall and a lower wall which connect the outer wall and the inner wall, wherein the inner space of the heat-dissipating structure is a vacuum space such that heat is prevented from being transferred from the inner wall to the outer wall, and wherein the lower wall forms a closed bottom of the heat-dissipating structure, the lower wall of the heat-dissipating structure has a multi-wall structure, and a vacuum space is formed in the lower wall to prevent the heat generated by the inner wall from being transferred through the lower wall.

2. The aerosol-generating device of claim 1, wherein the inner wall comprises an extending portion extending into each of the upper wall and the lower wall.

3. The aerosol-generating device of claim 2, wherein the extending portion is formed along a circumference direction of the upper wall and the lower wall.

4. The aerosol-generating device of claim 3, wherein the extending portion includes a portion extending in a longitudinal direction that is a direction in which the aerosol-generating article is inserted.

5. The aerosol-generating device of claim 1, wherein the lower wall covers a gap between the inner wall and the outer wall at a bottom of the heat-dissipating structure.

6. The aerosol-generating device of claim 1, wherein the outer wall of the heat-dissipating structure is made of a non-metal material.

7. An aerosol-generating device comprising:

a housing having an opening configured to receive an aerosol-generating article;

an accommodating space configured to accommodate the aerosol-generating article inserted through the opening;

a heat-dissipating structure comprising an inner wall and an outer wall that surrounds the inner wall such that an inner space is formed between the inner wall and the outer wall;

a coil arranged in the heat-dissipating structure and configured to generate an induced magnetic field; and a susceptor configured to generate heat based on the induced magnetic field, and arranged to surround the accommodating space such that the coil is disposed between the susceptor and the inner wall, wherein the heat-dissipating structure has an upper wall and a lower wall which connect the outer wall and the inner wall, wherein the inner space of the heat-dissipating structure is a vacuum space such that heat is prevented from being transferred from the inner wall to the outer wall, and wherein the lower wall forms a closed bottom of the heat-dissipating structure, the lower wall of the heat-dissipating structure has a multi-wall structure, and a vacuum space is formed in the lower wall such that heat is prevented from being transferred through the lower wall.

8. The aerosol-generating device of claim 7, wherein the lower wall is formed to cover a gap between the inner wall and the outer wall at a bottom of the heat-dissipating structure.

9. The aerosol-generating device of claim 8, wherein a through hole through which a wire passes is formed in the lower wall, and the coil is electrically connected to a controller of the aerosol-generating device through the wire.

10. The aerosol-generating device of claim 7, wherein the heat-dissipating structure includes a paramagnetic metal configured to block the induced magnetic field generated from the coil.

11. An aerosol-generating system comprising:

the aerosol-generating device according to claim 1; and an aerosol-generating article accommodated in the aerosol-generating device.

* * * * *